United States Patent
Garg et al.

(10) Patent No.: US 11,334,384 B2
(45) Date of Patent: May 17, 2022

(54) SCHEDULER QUEUE ASSIGNMENT BURST MODE

(71) Applicant: Advanced Micro Devices, Inc., Santa Clara, CA (US)

(72) Inventors: Alok Garg, Maynard, MA (US); Scott Andrew McLelland, Arlington, MA (US); Marius Evers, Sunnyvale, CA (US); Matthew T. Sobel, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 147 days.

(21) Appl. No.: 16/709,527

(22) Filed: Dec. 10, 2019

(65) Prior Publication Data
US 2021/0173702 A1   Jun. 10, 2021

(51) Int. Cl.
*G06F 9/46* (2006.01)
*G06F 9/48* (2006.01)

(52) U.S. Cl.
CPC .................................. *G06F 9/4881* (2013.01)

(58) Field of Classification Search
CPC ...................................................... G06F 9/4881
USPC ........................................................ 718/105
See application file for complete search history.

(56) References Cited

U.S. PATENT DOCUMENTS

| 6,519,683 | B2* | 2/2003 | Samra | G06F 9/3802 711/125 |
| 6,782,445 | B1* | 8/2004 | Olgiati | G06F 9/3879 710/35 |
| 6,782,461 | B2* | 8/2004 | Lam | G06F 5/065 710/54 |

(Continued)

FOREIGN PATENT DOCUMENTS

| EP | 2466476 A1 | 6/2012 |
| WO | 9900936 A1 | 1/1999 |
| WO | 2019231904 A1 | 12/2019 |

OTHER PUBLICATIONS

International Search Report and Written Opinion in International Application No. PCT/US2020/063765, dated Mar. 22, 2021, 11 pages.

(Continued)

*Primary Examiner* — Mehran Kamran
(74) *Attorney, Agent, or Firm* — Kowert Hood Munyon Rankin and Goetzel PC; Rory D. Rankin

(57) ABSTRACT

Systems, apparatuses, and methods for implementing scheduler queue assignment burst mode are disclosed. A scheduler queue assignment unit receives a dispatch packet with a plurality of operations from a decode unit in each clock cycle. The scheduler queue assignment unit determines if the number of operations in the dispatch packet for any class of operations is greater than a corresponding threshold for dispatching to the scheduler queues in a single cycle. If the number of operations for a given class is greater than the corresponding threshold, and if a burst mode counter is less (Continued)

than a burst mode window threshold, the scheduler queue assignment unit dispatches the extra number of operations for the given class in a single cycle. By operating in burst mode for a given operation class during a small number of cycles, processor throughput can be increased without starving the processor of other operation classes.

20 Claims, 7 Drawing Sheets

(56) References Cited

U.S. PATENT DOCUMENTS

| | | | | |
|---|---|---|---|---|
| 7,047,322 | B1* | 5/2006 | Bauman | G06F 12/0835 710/33 |
| 7,406,554 | B1* | 7/2008 | Huffman | G06F 13/1642 710/112 |
| 7,689,793 | B1* | 3/2010 | Solt | G06F 12/023 711/170 |
| 7,768,910 | B2* | 8/2010 | Neidhardt | H04L 47/283 370/230 |
| 9,397,961 | B1* | 7/2016 | Bailey | H04L 49/9005 |
| 9,424,045 | B2 | 8/2016 | Airaud et al. | |
| 9,606,800 | B1 | 3/2017 | Hameenanttila et al. | |
| 10,552,163 | B2* | 2/2020 | Chan | G06F 9/3836 |
| 10,601,723 | B2* | 3/2020 | Smith | H04L 49/901 |
| 2002/0019927 | A1* | 2/2002 | Hondou | G06F 9/3885 712/214 |
| 2004/0151197 | A1* | 8/2004 | Hui | H04L 47/2416 370/412 |
| 2005/0283772 | A1* | 12/2005 | Muthukumar | G06F 8/4452 717/151 |
| 2006/0080478 | A1* | 4/2006 | Seigneret | G06F 13/28 710/22 |
| 2006/0174247 | A1* | 8/2006 | Farrell | G06F 9/5027 718/104 |
| 2007/0220388 | A1* | 9/2007 | Quereshi | G06F 1/3275 714/731 |
| 2007/0223372 | A1* | 9/2007 | Haalen | H04L 47/20 370/229 |
| 2008/0320274 | A1* | 12/2008 | Singh | G06F 9/3836 712/23 |
| 2009/0019264 | A1* | 1/2009 | Correale, Jr. | G06F 1/324 712/216 |
| 2009/0019265 | A1* | 1/2009 | Correale, Jr. | G06F 9/3869 712/216 |
| 2010/0241760 | A1* | 9/2010 | Zhang | H04L 43/16 709/235 |
| 2010/0318716 | A1* | 12/2010 | Nguyen | G06F 13/4027 710/314 |
| 2010/0325394 | A1* | 12/2010 | Golla | G06F 9/3851 712/208 |
| 2011/0044699 | A1* | 2/2011 | Li | H04J 3/1694 398/182 |
| 2011/0078697 | A1* | 3/2011 | Smittle | G06F 9/384 718/104 |
| 2011/0145616 | A1* | 6/2011 | Rychlik | G06F 9/5027 713/323 |
| 2012/0144175 | A1* | 6/2012 | Venkataramanan | G06F 9/3836 712/246 |
| 2014/0379506 | A1* | 12/2014 | Marshall | H04L 47/215 705/26.1 |
| 2014/0380324 | A1* | 12/2014 | Xiao | G06F 9/5083 718/102 |
| 2015/0081941 | A1* | 3/2015 | Brown | G06F 13/362 710/116 |
| 2015/0095666 | A1* | 4/2015 | Ananthakrishnan | G06F 1/26 713/300 |
| 2015/0106595 | A1* | 4/2015 | Khot | G06F 9/3851 712/215 |
| 2017/0017490 | A1* | 1/2017 | Caulfield | G06F 9/3802 |
| 2017/0177261 | A1* | 6/2017 | Filderman | G06F 3/0634 |
| 2017/0230269 | A1* | 8/2017 | Kamath | H04L 41/0816 |
| 2019/0163486 | A1* | 5/2019 | Sinharoy | G06F 9/30036 |
| 2019/0220949 | A1* | 7/2019 | Dutta | G10L 19/008 |
| 2019/0347125 | A1* | 11/2019 | Sankaran | G06F 9/3859 |
| 2019/0369991 | A1* | 12/2019 | Sobel | G06F 9/3836 |

OTHER PUBLICATIONS

International Search Report and Written Opinion in International Application No. PCT/US2019/034161, dated Sep. 18, 2019, 14 pages.

"Efficient Scheduling and Operand Renaming of Groups of Instructions", Research Disclosure, Apr. 1, 1999, pp. 580-584, No. 420138, Kenneth Mason Publications, UK, GB.

Shah et al., "Optimal Queue-Size Scaling in Switched Networks", The Annals of Applied Probability, Sep. 3, 2014, 40 pages, vol. 24, No. 6, Institute of Mathematical Statistics, https://arxiv.org/pdf/1110.4697.pdf. [Retrieved Apr. 2, 2018].

International Search Report and Written Opinion in International Application No. PCT/US2019/026571, dated Jun. 21, 2019, 12 pages.

Notice of Allowance in U.S. Appl. No. 15/991,088, dated Nov. 24, 2021, 9 pages.

* cited by examiner

SCHEDULER QUEUE ASSIGNMENT BURST MODE

BACKGROUND

Description of the Related Art

A processor pipeline includes many different units which operate on instructions being executed. These units include a decode unit, scheduler, scheduler queues, pickers, and execution units. The decode unit decodes fetched instructions into instruction operations. Instruction operations are also referred to as "ops" herein. Generally speaking, an op is an operation that the hardware included in the execution units is capable of executing. In various implementations, each instruction translates to one or more ops which, when executed, result in the performance of the operations defined for that instruction according to an instruction set architecture. After the scheduler dispatches decoded ops to the scheduler queues, pickers select ops out of the scheduler queues to be executed by the execution units.

A typical scheduler provisions the amount of dispatch bandwidth available to each class of ops in favor of overall performance gain. For a typical scheduler, the dispatch bandwidth assigned to each class of ops matches the number of execution units for that class of ops. This approach works well when a program observes a steady and correct mix of ops in every cycle. However, when one class of ops appears in a short burst, this can disrupt the performance of the processor for the typical scheduler.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing scheduler queue assignment burst mode are disclosed herein. A system includes one or more processors coupled to one or more memories. Each processor includes a processor pipeline with a plurality of pipeline stages for fetching, processing, and executing instructions. In one implementation, the processor employs out-of-order execution of instructions. Instructions are fetched and then decoded by a decode unit into instruction operations (or "ops"). The decode unit conveys a dispatch packet of decoded ops to a scheduler queue assignment unit in each clock cycle.

In one implementation, when the scheduler queue assignment unit receives a dispatch packet, the scheduler queue assignment unit determines if the number of ops in the dispatch packet for any class of ops is greater than the maximum allowable number of ops for issuing to scheduler queues for that particular class in a single cycle. In one embodiment, each class of operations refers to a different type of ops being executable by a different type of execution unit. For example, different types of ops include one or more of arithmetic logic unit (ALU) ops, address generation unit (AGU) ops, floating point ops, integer ops, load/store ops, and so on. If the number of ops for a given class is greater than the allowable number, and if a burst mode counter is less than a threshold, then the scheduler queue assignment unit dispatches the extra number of ops for the given class in a single cycle and also increments the burst mode counter. By operating in burst mode for a given op class during a small number of cycles, processor throughput can be increased without starving the processor of other types of op classes.

Figure 1:
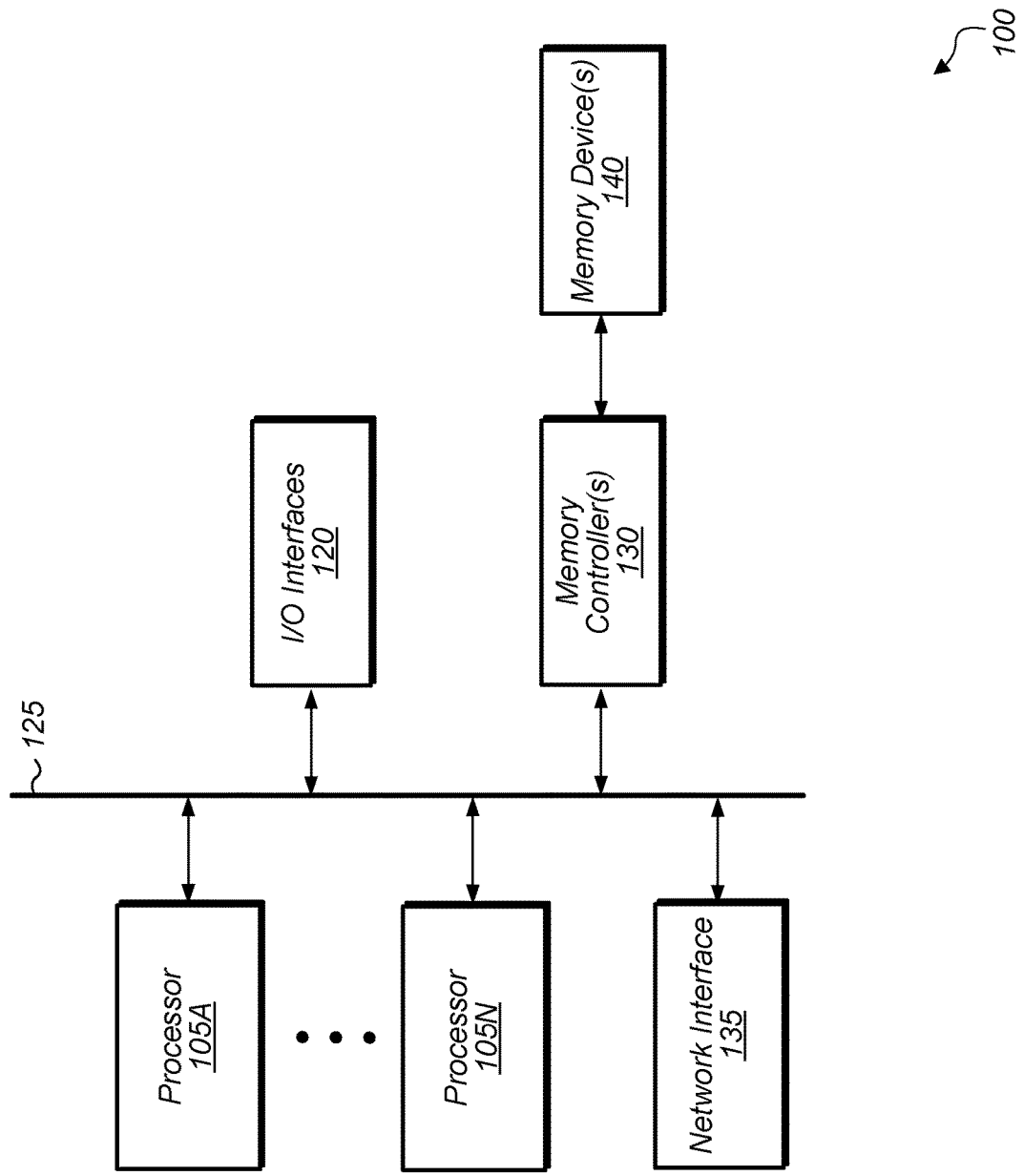
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
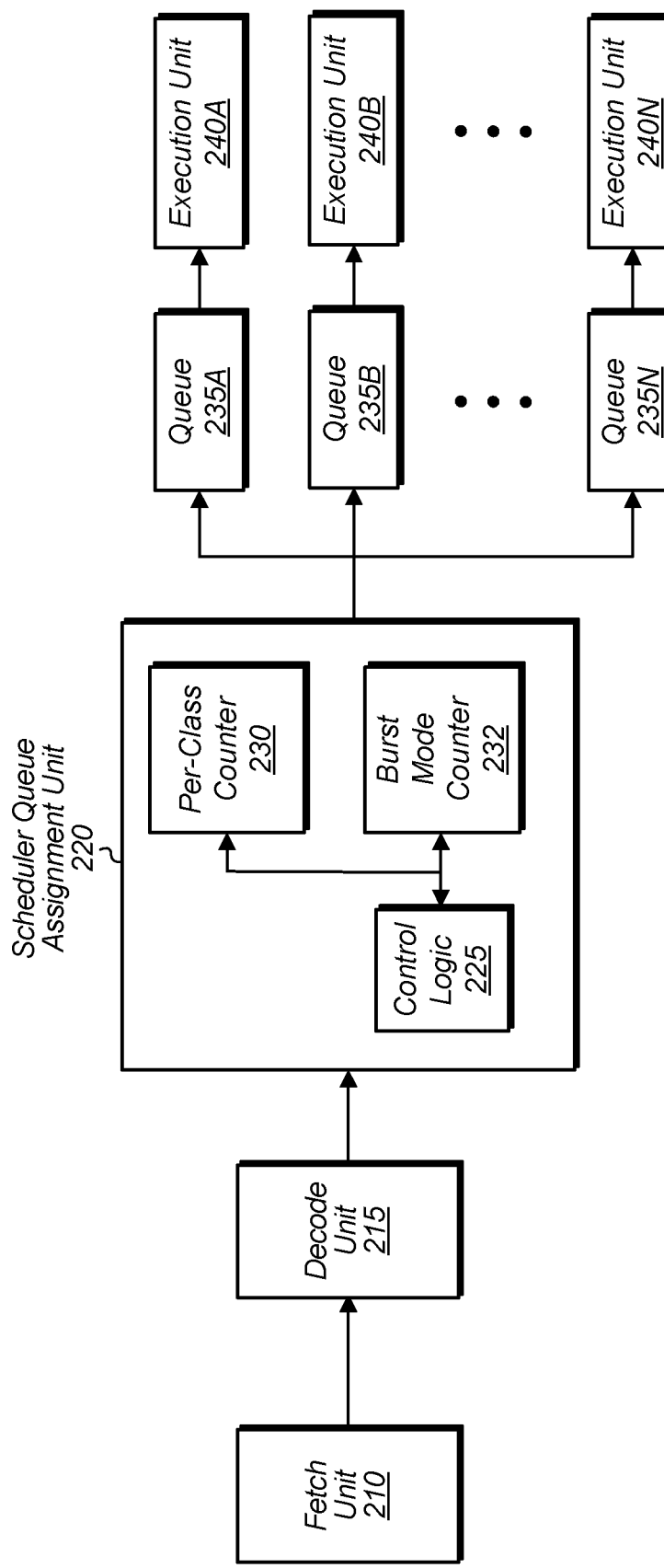
FIG. 2 is a block diagram of one implementation of a processor pipeline.

Turning now to FIG. 2, a block diagram of one implementation of a processor pipeline 200 is shown. In various implementations, processors 105A-N (of FIG. 1) include one or more instantiations of processor pipeline 200. In one implementation, processor pipeline 200 includes at least fetch unit 210, decode unit 215, scheduler queue assignment unit 220, queues 235A-N, and execution units 240A-N. It is noted that queues 235A-N are also referred to as scheduler queues herein. It should also be understood that processor pipeline 200 also includes other components (e.g., branch prediction unit, instruction cache) which are not shown to avoid obscuring the figure. In other implementations, processor pipeline 200 is structured in other suitable manners.

In one implementation, fetch unit 210 fetches instructions of a program stream from memory and/or an instruction cache, and fetch unit 210 conveys the fetched instructions to decode unit 215. Decode unit 215 decodes the fetched instructions into instruction operations (or ops for short). It is noted that ops can also be referred to as operations, micro-ops, or uops. Generally, an instruction operation is an operation that the hardware included in execution units 240A-N is capable of executing. In various implementations, each instruction translates to one or more ops which, when executed, result in the performance of the operations defined for that instruction according to the instruction set architecture. Any type of instruction set architecture (ISA) is employed by processor pipeline 200, with the type of ISA varying from implementation to implementation.

Decode unit 215 identifies the type of instructions, source operands, etc., and each decoded op includes the instruction along with some of the decode information. In implementations in which each instruction translates to a single op, each op is the corresponding instruction or a portion thereof (e.g., the opcode field or fields of the instruction). In some implementations, decode unit 215 includes any combination of circuitry and/or microcode for generating ops for instructions. For example, in one implementation, relatively simple op generations (e.g., one or two ops per instruction) are handled in hardware while more extensive op generations (e.g., more than three ops for an instruction) are handled in microcode.

The ops from decode unit 215 are provided in dispatch packets to scheduler queue assignment unit 220. Scheduler queue assignment unit 220 determines how to assign the ops to the scheduler queues 235A-N. As used herein, a "dispatch packet" is defined as a group of ops that are decoded in a single clock cycle by decode unit 215. When ops are forwarded from scheduler queue assignment unit 220 to scheduler queues 235A-N, the ops have transitioned from the in-order portion of pipeline 200 to the out-of-order portion of pipeline 200. Providing a steady stream of ops to the out-of-order portion of pipeline 200 helps to ensure an acceptable performance level is maintained by the processor.

In a normal non-burst mode, scheduler queue assignment unit 220 enforces a limit on the number of ops per class that can be dispatched to scheduler queues 235A-N in a single clock cycle. However, if certain conditions are met, then scheduler queue assignment unit 220 allows this limit to be exceeded for a small window of cycles if more than the permissible number of ops for a given class of ops are received. This can help improve processor performance by allowing the in-order portion of pipeline 200 to move on to another class of ops quickly while the execution units 240A-N are still working on the burst in the background.

In one implementation, scheduler queue assignment unit 220 includes control logic 225 coupled to counters 230-232. Per-class counters 230 is representative of any number of counters for counting the different numbers of ops included in the dispatch packets forwarded to scheduler queue assignment unit 220 from decode unit 215. Burst mode counter 232 tracks the number of cycles that scheduler queue assignment unit 220 has been in burst mode. In one implementation, there is a separate burst mode counter for each different class of ops. In one implementation, only one class of ops is allowed to be in burst mode during any given cycle. Alternatively, in another implementation, two separate classes of ops are allowed to be in burst mode in a single cycle. When burst mode counter 232 reaches a threshold, scheduler queue assignment unit 220 is prevented from going into burst mode due to difficulty in distributing ops to scheduler queues evenly during burst. This ensures that the relative occupancy of scheduler queues remains reasonably balanced for a single class of ops.

In one implementation, scheduler queue assignment unit 220 attempts to select an assignment permutation for the ops of a dispatch packet such that execution throughput will be maximized for processor pipeline 200. Scheduler queue assignment unit 220 also selects assignment permutations so that ops will be assigned to queues 235A-N which are coupled to execution units 240A-N that are able to actually execute the specific type of op. As shown in processor pipeline 200, each queue 235A-N is coupled to a corresponding execution unit 240A-N. However, in other implementations, one or more queues 235A-N are coupled to multiple execution units 240A-N.

After receiving a dispatch packet, scheduler queue assignment unit 220 selects the ops to assign to queues 235A-N in a given clock cycle. When the dependencies are resolved and the ops are ready to execute, pickers (not shown) will pick the ops out of queues 235A-N to execute on the execution units 240A-N. In one implementation, individual execution units 240A-N are able to execute only a subset of the total number of different type of ops that are encountered in a typical program sequence. Accordingly, scheduler queue assignment unit 220 assigns ops to the appropriate queues 235A-N so that these ops will be executed by an execution unit 240A-N that is able to execute these specific types of ops.

Figure 3:
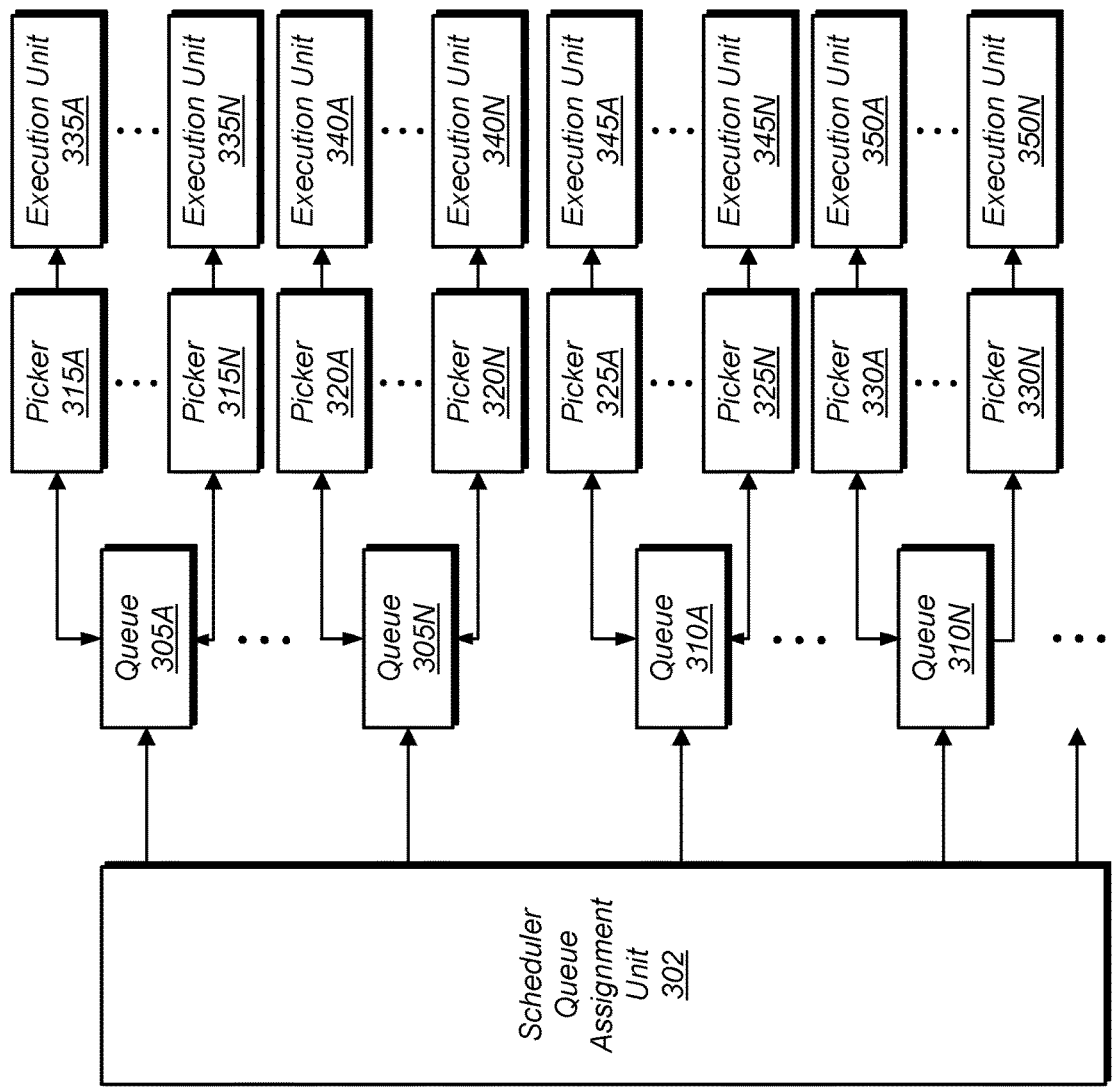
FIG. 3 is a block diagram of one implementation of a portion of a processor pipeline.

Referring now to FIG. 3, a block diagram of one implementation of a portion of a processor pipeline 300 is shown.

In one implementation, the portion of processor pipeline 300 is included within one or more of processors 105A-N (of FIG. 1). Scheduler queue assignment unit 302 receives dispatch packets from a decode unit (not shown), and scheduler queue assignment unit 302 determines how to dispatch ops from the dispatch packets to queues 305A-N and 310A-N. Queues 305A-N and 310A-N are representative of any number of different sets of schedule queues. Depending on the implementation, the processor processes any number of different op types (e.g., ALU ops, address generation ops, floating point ops, fixed point ops, branch ops, multiply ops, division ops). Each set of scheduler queues 305A-N and 310A-N handles some subset of these different op types based on the capabilities of the execution units 335A-N, 340A-N, 345A-N, and 350A-N to which they supply ops for execution.

In one implementation, each queue 305A-N stores ops of a first type while each queue 310A-N stores ops of a second type. For example, in one implementation, scheduler queue assignment unit 302 assigns ALU ops to queues 305A-N, scheduler queue assignment unit 302 assigns address generation ops to queues 310A-N, and so on. In other implementations, scheduler queue assignment unit 302 assigns other types of ops to corresponding queues. Each queue 305A-N has any number of pickers 315A-N and 320A-N which pick ops to be executed on a corresponding execution unit 335A-N or 340A-N. Similarly, each queue 310A-N has any number of pickers 325A-N and 330A-N which pick ops to be executed on a corresponding execution unit 345A-N or 350A-N. In one implementation, there is a separate picker 315A-N for queue 305A for each different type of op that is able to be stored in queue 305A. Each different type of op will be executed on a different type of execution unit, with execution units 335A-N representative of any number of different execution units which execute different types of ops. It is noted that in one implementation, some execution units are able to execute more than one type of op.

For the other queues, each picker picks ops from the queue that will be executed on an execution unit coupled to the picker. For example, pickers 320A-N pick ops from queue 305N to be executed on execution units 340A-N respectively, pickers 325A-N pick ops from queue 310A to be executed on execution units 345A-N respectively, and pickers 330A-N pick ops from queue 310N to be executed on execution units 350A-N respectively. In one implementation, there is a different execution unit coupled to each queue (via a picker) for each different type of op supported by the processor pipeline. However, in some implementations, some of the queues store only a subset of all of the different types of ops that are being executed by the processor pipeline. For example, in an implementation where the processor executes two types of ops (ALU and address generation ops), some queues store only ALU ops while other queues store only address generation ops.

It should be understood that the number of scheduler queues and execution units for the different op types varies from implementation to implementation. The examples described throughout this disclosure are meant to illustrate non-limiting examples of implementations. In other implementations, processors employing other numbers of scheduler queues, execution units, and other related structures are possible and are contemplated.

Figure 4:
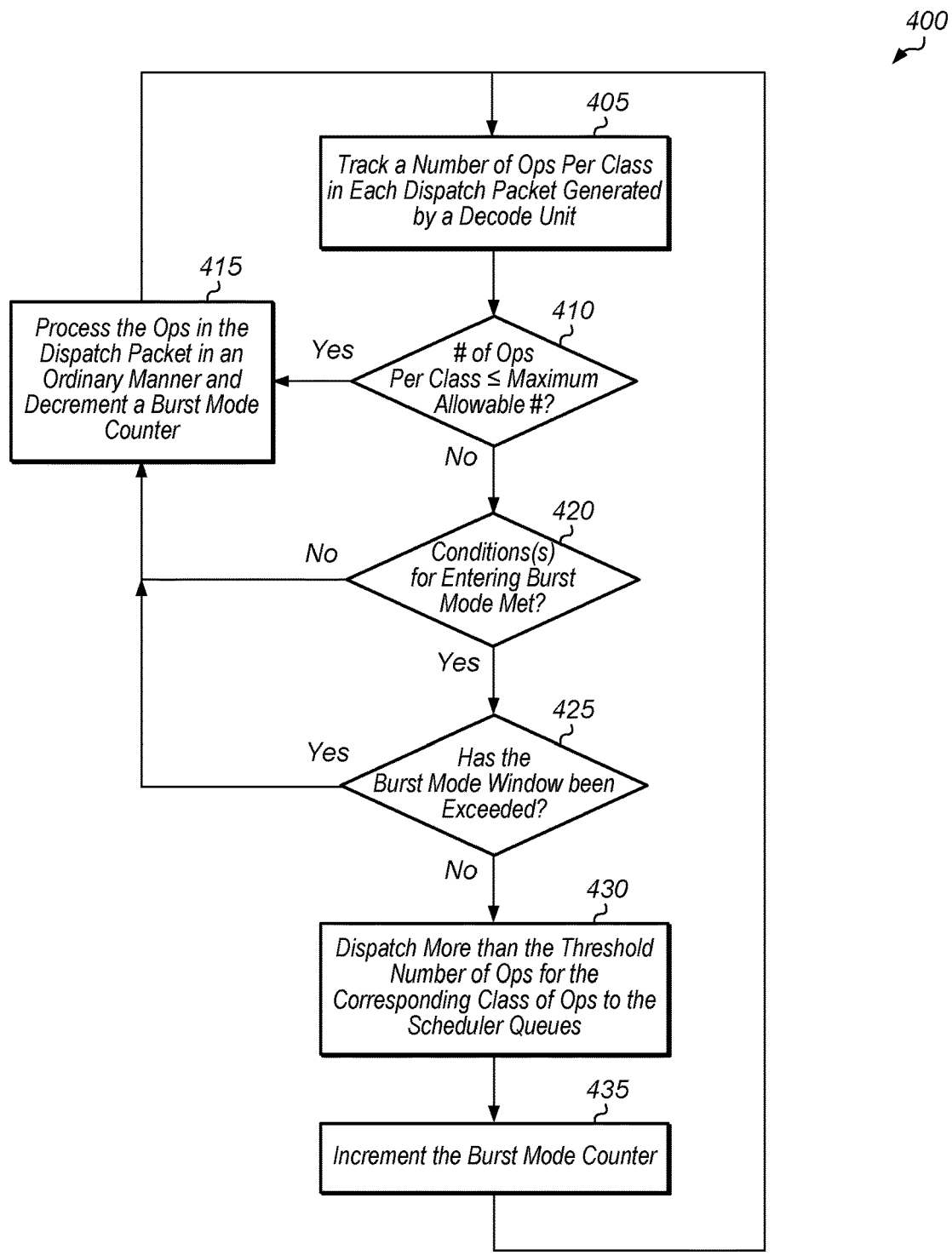
FIG. 4 is a generalized flow diagram illustrating one implementation of a method for determining when to enter scheduler queue assignment burst mode.
Figure 5:
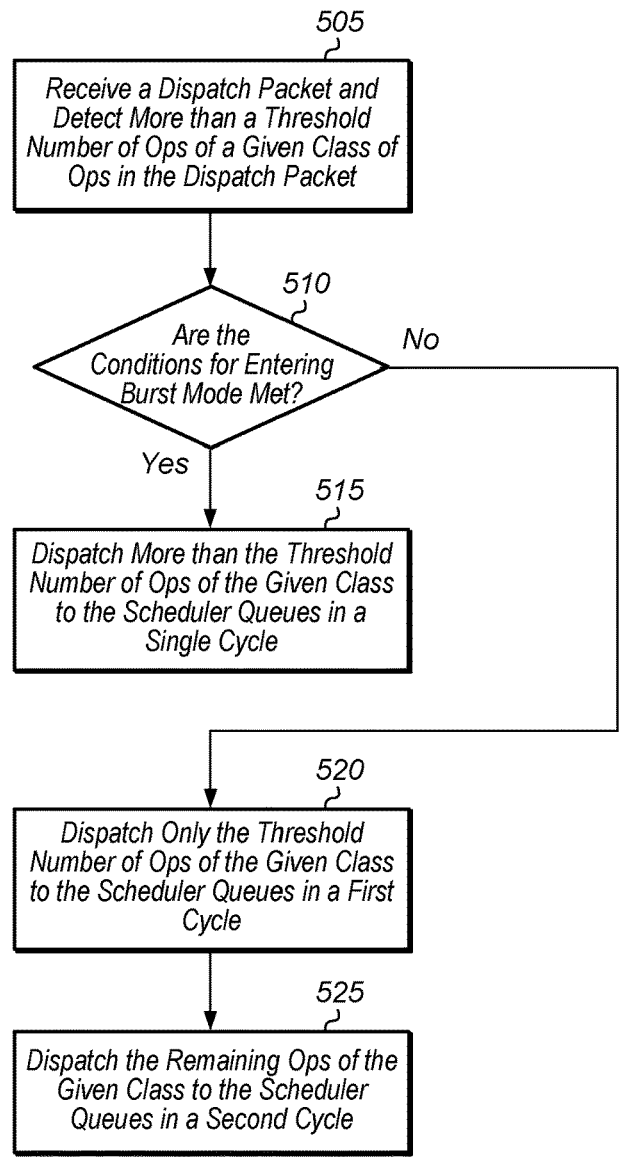
FIG. 5 is a generalized flow diagram illustrating one implementation of a method for a scheduler queue assignment unit entering burst mode.
Figure 6:
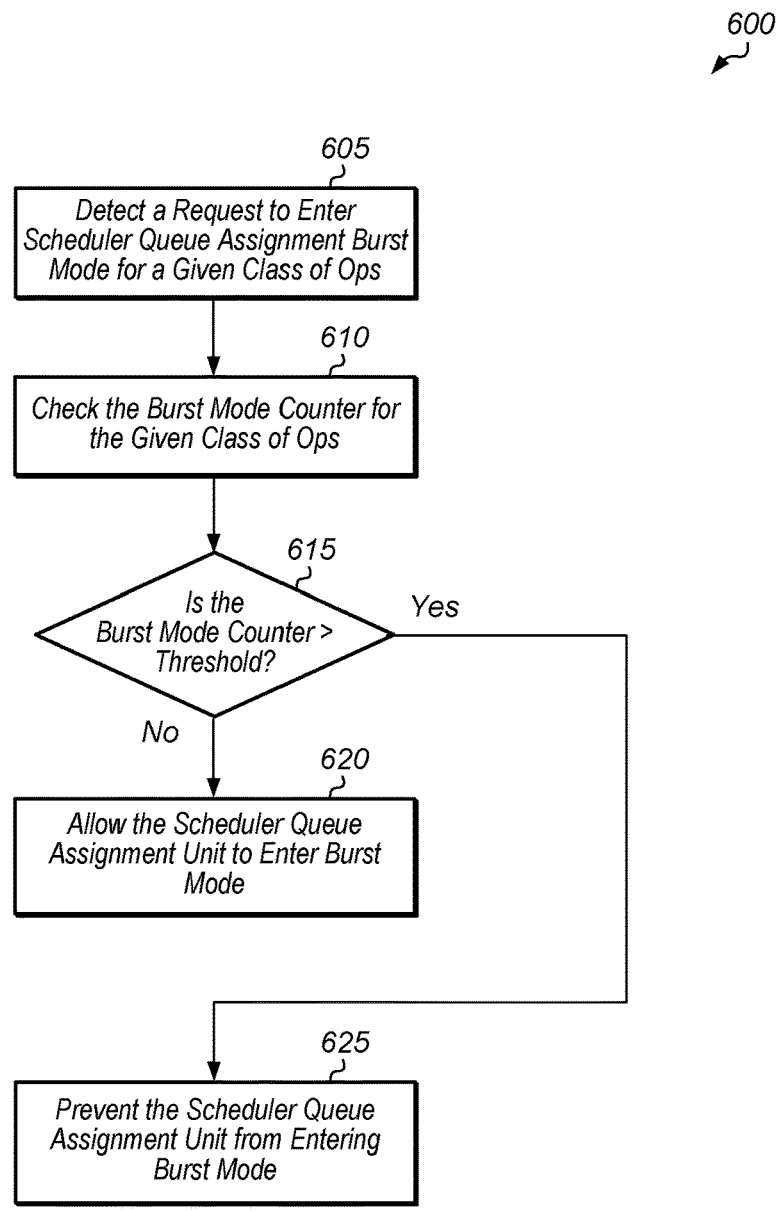
FIG. 6 is a generalized flow diagram illustrating one implementation of a method for determining whether to enter scheduler queue assignment burst mode.
Figure 7:
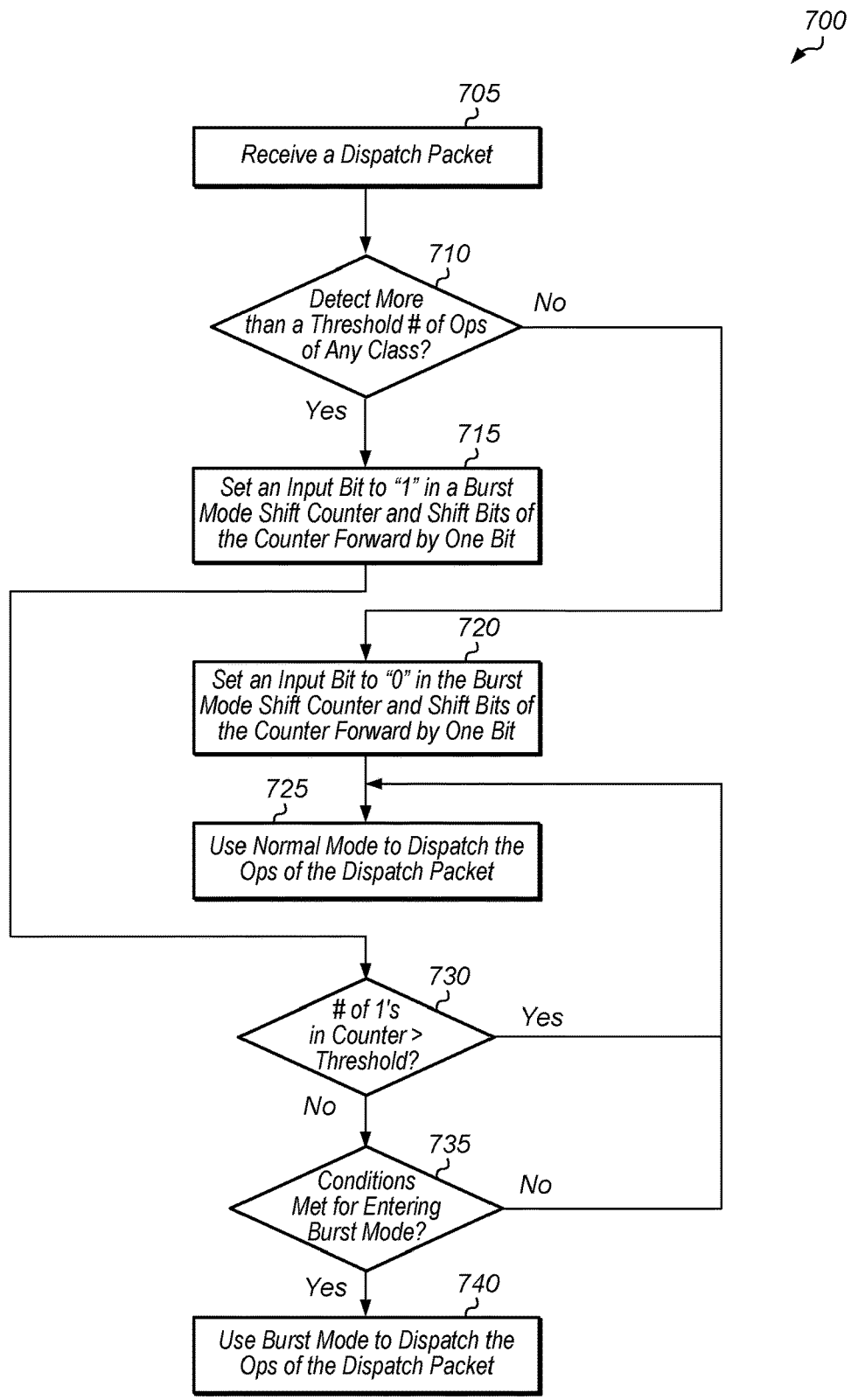
FIG. 7 is a generalized flow diagram illustrating one implementation of a method for tracking a burst mode window.

Turning now to FIG. 4, one implementation of a method 400 for determining when to enter scheduler queue assignment burst mode is shown. For purposes of discussion, the steps in this implementation and those of FIG. 5-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A scheduler queue assignment unit (e.g., scheduler queue assignment unit 220 of FIG. 2) tracks a number of ops per class in each dispatch packet generated by a decode unit (block 405). In one implementation, the scheduler queue assignment unit uses a per-class counter to track the number of ops per class in each dispatch packet. Next, the scheduler queue assignment unit determines if the number of ops of any class in a dispatch packet is greater than the maximum allowable number for the particular class (conditional block 410). In one implementation, the maximum allowable number for the particular class is equal to the number of execution units able to execute the particular class of ops. It is noted that different classes of ops can have different maximum allowable numbers. For example, in one scenario, ALU ops have a maximum allowable number of four ops per dispatch packet, AGU ops have a maximum allowable number of three ops per dispatch packet, floating point ops have a maximum allowable number of two ops per dispatch packet, and so on.

If the number of ops of each class in the dispatch packet is less than or equal to the maximum allowable number for the particular class (conditional block 410, "yes" leg), then the scheduler queue assignment unit processes the ops in the dispatch packet in an ordinary manner and decrements a burst mode counter (e.g., burst mode counter 232 of FIG. 2) (block 415). If the burst mode counter is equal to zero, then the burst mode counter remains at zero in block 415. After block 415, method 400 returns to block 405 for the next dispatch packet.

If the number of ops of any class in the dispatch packet is greater than the maximum allowable number for the particular class (conditional block 410, "no" leg), then the scheduler queue assignment unit determines if one or more conditions for entering burst mode are met (conditional block 420). In one implementation, a first condition for entering burst mode is the current occupancy of the corresponding scheduler queues being less than or equal to an occupancy threshold. In one implementation, the scheduler queue assignment unit checks the occupancy of the scheduler queues which store ops of the class which has greater than the maximum allowable number of ops in the current dispatch packet. In another implementation, the scheduler queue assignment unit checks the occupancy of all of the scheduler queues in the processor pipeline. In one implementation, a second condition for entering burst mode is checking if a valid assignment permutation exists for dispatching greater than the maximum allowable number ops for the particular class based on various scheduler queue and picker constraints. In other implementations, other conditions can be checked to determine whether to enter burst mode.

If the one or more conditions for entering burst mode are not met (conditional block 420, "no" leg), then the scheduler queue assignment unit processes the ops in the dispatch packet in an ordinary manner and decrements the burst mode counter (block 415). Otherwise, if the one or more conditions for entering burst mode are met (conditional block 420, "yes" leg), then the scheduler queue assignment unit determines if the burst mode window has been exceeded for the corresponding class of ops (conditional block 425). In one implementation, the scheduler queue assignment unit determines if the burst mode window has been exceeded by checking the burst mode counter and comparing the burst mode counter to a burst mode window threshold.

If the burst mode window has been exceeded for the corresponding class of ops (conditional block 425, "yes" leg), then the scheduler queue assignment unit processes the ops in the dispatch packet in an ordinary manner and decrements the burst mode counter (block 415). Otherwise, if the burst mode window has not been exceeded for the given class of ops (conditional block 425, "no" leg), then the scheduler queue assignment unit dispatches more than the threshold number of ops for the corresponding class of ops to the scheduler queues (block 430). Also, the scheduler queue assignment unit increments the burst mode counter (block 435). After block 435, method 400 returns to block 405.

Referring now to FIG. 5, one implementation of a method 500 for a scheduler queue assignment unit entering burst mode is shown. A scheduler queue assignment unit (e.g., scheduler queue assignment unit 220 of FIG. 2) receives a dispatch packet and detects more than a threshold number of ops of a given class of ops in the dispatch packet (block 505). Next, the scheduler queue assignment unit determines if the conditions for entering burst mode are met (conditional block 510). In one implementation, the conditions for entering burst mode include scheduler queue occupancy being less than a first threshold and a burst mode counter being less than a second threshold. In other implementations, other conditions for entering burst mode can be employed.

If the conditions for entering burst mode are met (conditional block 510, "yes" leg), then more than the threshold number of ops of the given class are dispatched to the scheduler queues in a single cycle (block 515). Otherwise, if the conditions for entering burst mode are not met (conditional block 510, "no" leg), then only the threshold number of ops of the given class are dispatched to the scheduler queues in a first cycle (block 520). In some cases, the scheduler queue assignment unit can decide to dispatch fewer than the threshold number of ops of the given class to the scheduler queues in the first cycle. Next, the remaining ops of the given class are dispatched to the scheduler queues in a second cycle (block 525). It is noted that one or more ops for the given class of ops from the subsequent dispatch packet can be dispatched with the remaining ops from the previous dispatch packet in the second cycle. After blocks 515 and 525, method 500 ends.

Turning now to FIG. 6, one implementation of a method 600 for determining whether to enter scheduler queue assignment burst mode is shown. Control logic detects a request to enter scheduler queue assignment burst mode for a given class of ops (block 605). In response to detecting the request, the control logic checks the burst mode counter for the given class of ops (block 610). If the burst mode counter is less than or equal to a threshold (conditional block 615, "no" leg), then the control logic allows the scheduler queue assignment unit (e.g., scheduler queue assignment unit 220 of FIG. 2) to enter burst mode (block 620). Otherwise, if the burst mode counter is greater than the threshold (conditional block 615, "yes" leg), then the control logic prevents the scheduler queue assignment unit from entering burst mode (block 625). After blocks 620 and 625, method 600 ends. It is noted that method 600 can also be performed in parallel with other methods which check whether other conditions (e.g., scheduler queue occupancy) are satisfied for entering scheduler queue assignment burst mode.

Referring now to FIG. 7, one implementation of a method 700 for tracking a burst mode window is shown. A scheduler queue assignment unit (e.g., scheduler queue assignment unit 220 of FIG. 2) receives a dispatch packet (block 705). If the scheduler queue assignment unit detects more than a threshold number of ops of any given class of ops in the dispatch packet (conditional block 710, "yes" leg), then the scheduler queue assignment unit sets an input bit to "1" in a burst mode shift counter and shifts bits of the counter forward by one bit (block 715). If the scheduler queue assignment unit does not detect more than the threshold number of ops of any given class of ops in the dispatch packet (conditional block 710, "no" leg), then the scheduler queue assignment unit sets an input bit to "0" in the burst mode shift counter and shifts bits of the counter forward by one bit (block 720). Also, the scheduler queue assignment unit uses normal mode to dispatch the ops of the dispatch packet (block 725). After block 725, method 700 ends.

After block 715, if the number of 1's in the burst mode shift counter is less than or equal to a burst mode window threshold (conditional block 730, "no" leg), then the scheduler queue assignment unit checks one or more other conditions for entering burst mode (conditional block 735). Otherwise, if the number of 1's in the burst mode shift counter is greater than the burst mode window threshold (conditional block 730, "yes" leg), then the scheduler queue assignment unit uses normal mode to dispatch the ops of the dispatch packet (block 725). If the one or more conditions for entering burst mode are met (conditional block 735, "yes" leg), then the scheduler queue assignment unit uses burst mode to dispatch the ops of the dispatch packet (block 740). Otherwise, if the one or more conditions for entering burst mode are not met (conditional block 735, "no" leg), then the scheduler queue assignment unit uses normal mode to dispatch the ops of the dispatch packet (block 725). After block 740, method 700 ends.

In one implementation, burst mode is tracked in a moving window of the last "N" cycles, where N is a positive integer. In this implementation, the burst mode shift counter is an "N" bit shift counter. In one implementation, the counter shifts left by a bit every cycle and the right-most new bit is set to "1" in block 715. In another implementation, the counter shifts right by a bit every cycle and the left-most new bit is set to "1" in block 715. It should be understood that in another implementation, the new bit can be set to "0" rather than "1" in block 715 and the new bit can be set to "1" rather than "0" in block 720. In this implementation, the scheduler queue assignment unit counts the number of 0's in the counter to determine if the burst mode window threshold has been exceeded. Generally speaking, the scheduler queue assignment unit counts the number of valid bits in the counter to determine if the burst mode window threshold has been exceeded. Other techniques for implementing a burst mode shift counter are possible and are contemplated.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL)

such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
control logic comprising circuitry configured to:
receive a dispatch packet comprising a plurality of operations from a decode unit;
determine whether a burst mode is indicated in which the dispatch packet contains a first number of operations of a single class which exceeds a corresponding threshold; and
dispatch, to a plurality of scheduler queues, a second number of operations of the single class greater than the corresponding threshold responsive to determining:
the first number of operations exceeds the corresponding threshold; and
a burst mode window has not been exceeded for the single class of operations, wherein the burst mode window indicates a period of time.

2. The system as recited in claim 1, wherein the corresponding threshold is equal to a number of execution units which are able to execute operations of the single class of operations.

3. The system as recited in claim 1, wherein the circuitry is configured to shift a valid bit into a burst mode shift counter responsive to detecting the first number of operations of the single class which exceeds the corresponding threshold.

4. The system as recited in claim 3, wherein determining a burst mode window has not been exceeded for the given class of operations comprises determining a number of valid bits in the burst mode shift counter is less than a burst mode window threshold.

5. The system as recited in claim 3, wherein the scheduler queue assignment unit is configured to shift a non-valid bit into the burst mode shift counter responsive to determining the dispatch packet does not include more than the corresponding threshold number of operations for any single class of operations.

6. The system as recited in claim 1, wherein the circuitry is configured to dispatch, to the plurality of scheduler queues, the second number of operations which is greater than the corresponding threshold for the single class of operations responsive to determining that scheduler queue occupancy is less than an occupancy threshold and responsive to determining that the burst mode window has not been exceeded for the single class of operations.

7. The system as recited in claim 1, wherein:
a first class of operations has a first threshold;
a second class of operations has a second threshold; and
the second threshold is different from the first threshold.

8. A method comprising:
receiving, by a scheduler queue assignment unit, a dispatch packet comprising a plurality of operations from a decode unit in a given cycle;
determining whether a burst mode is indicated in which the dispatch packet contains a first number of operations of a single class which exceeds a corresponding threshold;
dispatching, to a plurality of scheduler queues, a second number of operations of the single class greater than the corresponding threshold responsive to determining:
the first number of operations exceeds the corresponding threshold; and
a burst mode window has not been exceeded for the single class of operations, wherein the burst mode window indicates a period of time.

9. The method as recited in claim 8, wherein the corresponding threshold is equal to a number of execution units which are able to execute operations of the single class of operations.

10. The method as recited in claim 8, further comprising shifting a valid bit into a burst mode shift counter responsive to detecting the first number of operations of the single class which exceeds the corresponding threshold.

11. The method as recited in claim 10, wherein determining a burst mode window has not been exceeded for the given class of operations comprises determining a number of valid bits in the burst mode shift counter is less than a burst mode window threshold.

12. The method as recited in claim 10, further comprising shifting a non-valid bit into the burst mode shift counter responsive to determining the dispatch packet does not include more than the corresponding threshold number of operations for any single class of operations.

13. The method as recited in claim 8, further comprising dispatching the second number of operations which is greater than the corresponding threshold for the single class of operations responsive to determining that scheduler queue occupancy is less than an occupancy threshold and responsive to determining that the burst mode window has not been exceeded for the single class of operations.

14. The method as recited in claim 8, wherein:
a first class of operations has a first threshold;
a second class of operations has a second threshold; and
the second threshold is different from the first threshold.

15. An apparatus comprising:
a memory; and
a processor coupled to the memory;
wherein the processor is configured to:
generate, by a decode unit, a dispatch packet comprising a plurality of operations in a given cycle;
determine whether a burst mode is indicated in which the dispatch packet contains a first number of operations of a single class which exceeds a corresponding threshold; and
dispatch, to the plurality of scheduler queues, a second number of operations of the single class greater than the corresponding threshold responsive to determining:
the first number of operations exceeds the corresponding threshold; and
a burst mode window has not been exceeded for the single class of operations, wherein the burst mode window indicates a period of time.

16. The apparatus as recited in claim 15, wherein the corresponding threshold is equal to a number of execution units which are able to execute operations of the single class of operations.

17. The apparatus as recited in claim 15, wherein the processor is further configured to shift a valid bit into a burst mode shift counter responsive to detecting the first number of operations of the single class which exceeds the corresponding threshold.

18. The apparatus as recited in claim 17, wherein determining a burst mode window has not been exceeded for the single class of operations comprises determining a number of valid bits in the burst mode shift counter is less than a burst mode window threshold.

19. The apparatus as recited in claim 17, wherein the processor is further configured to shift a non-valid bit into the burst mode shift counter responsive to determining the dispatch packet does not include more than the corresponding threshold number of operations for any single class of operations.

20. The apparatus as recited in claim 15, wherein the processor is further configured to dispatch, to the plurality of scheduler queues, the second number of operations which is greater than the corresponding threshold for the single class of operations responsive to determining that scheduler queue occupancy is less than an occupancy threshold and responsive to determining that the burst mode window has not been exceeded for the single class of operations.

* * * * *